T. C. HARVEY.
WHEEL.
APPLICATION FILED APR. 23, 1920.
1,400,434.
Patented Dec. 13, 1921.
3 SHEETS—SHEET 1.
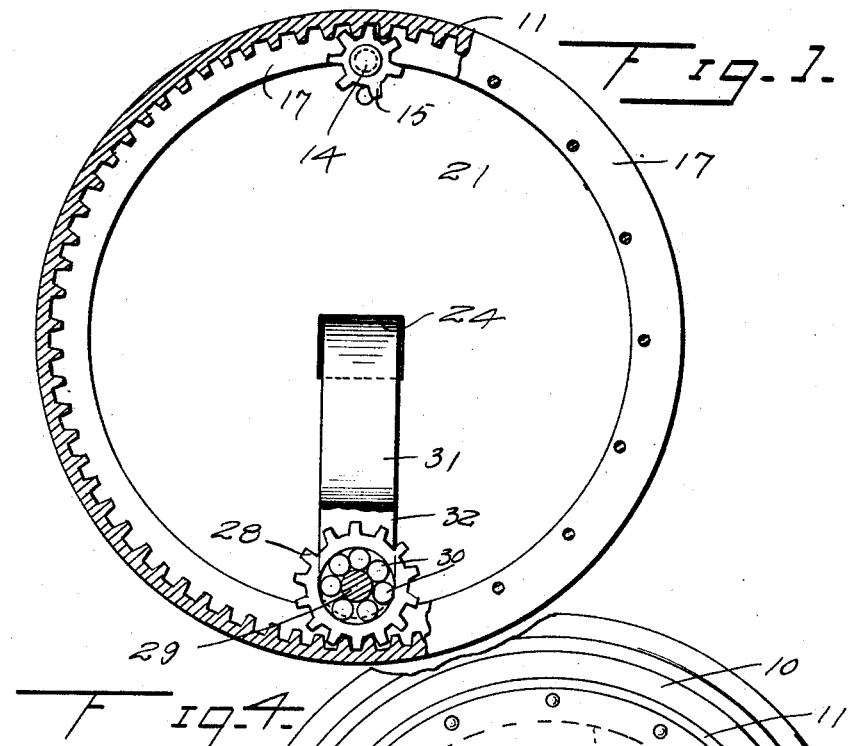
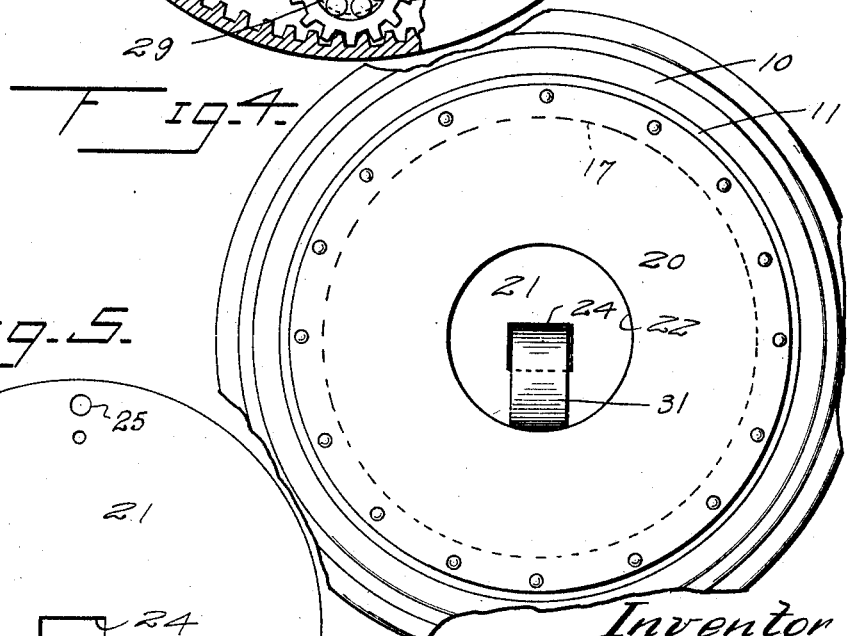
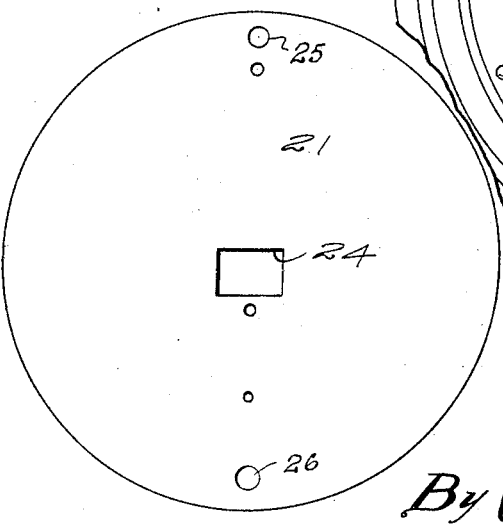
Inventor
T.C.Harvey
By [signature], Atty

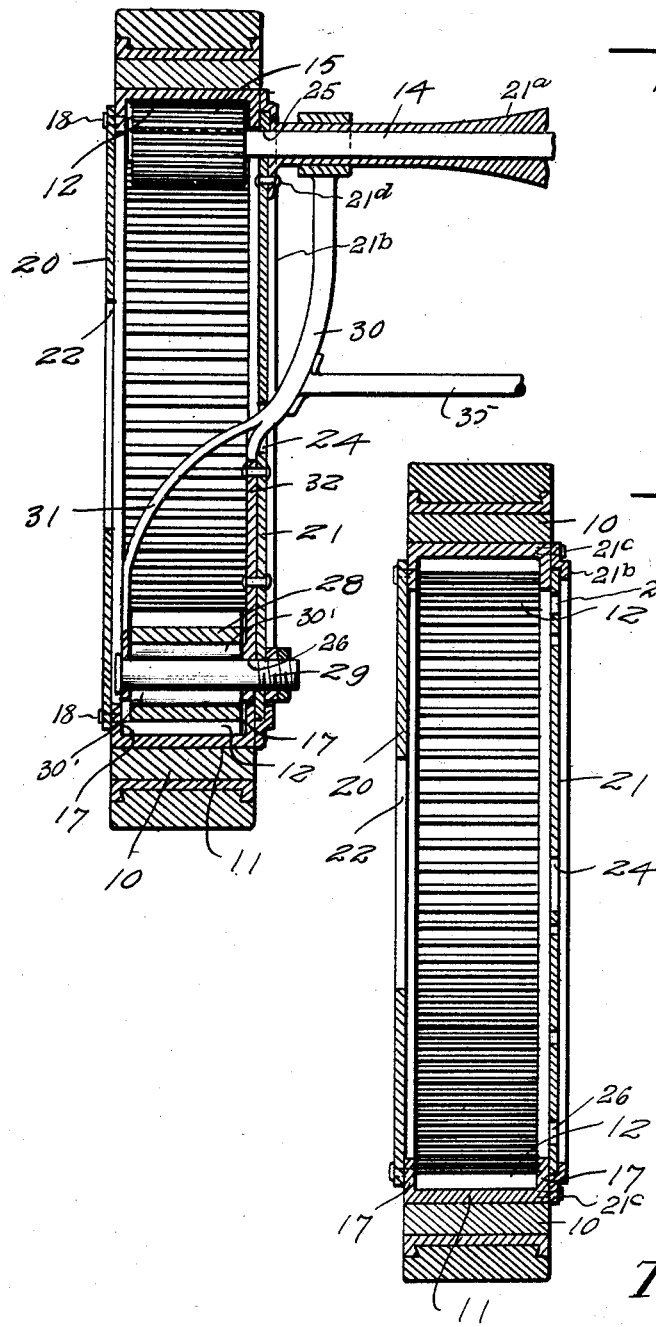

T. C. HARVEY.
WHEEL.
APPLICATION FILED APR. 23, 1920.
1,400,434.
Patented Dec. 13, 1921.
3 SHEETS—SHEET 3.
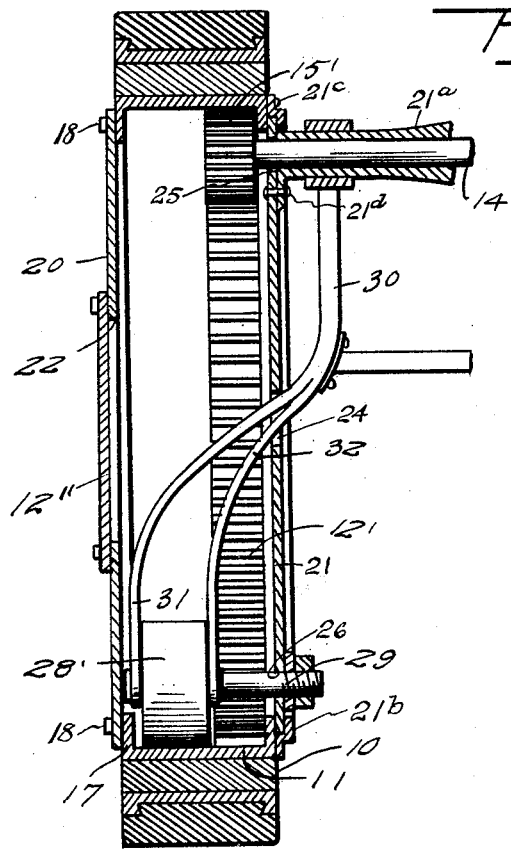
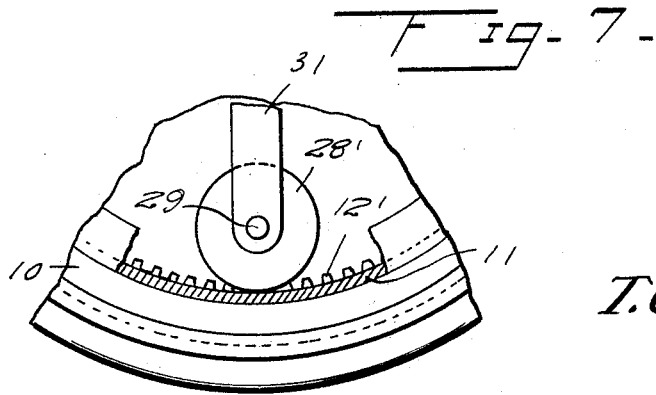
Inventor
T. C. Harvey

UNITED STATES PATENT OFFICE.

THOMAS C. HARVEY, OF CARROLLTON, MISSISSIPPI.

WHEEL.

1,400,434.  Specification of Letters Patent.  Patented Dec. 13, 1921.

Application filed April 23, 1920. Serial No. 376,106.

*To all whom it may concern:*

Be it known that I, THOMAS C. HARVEY, a citizen of the United States, residing at Carrollton, in the county of Carroll and State of Mississippi, have invented certain new and useful Improvements in Wheels; and I do hereby declare the following to be a full, clear, and exact description of the invention, such as will enable others skilled in the art to which it appertains to make and use the same.

This invention relates to a wheel, and one object is to provide a combined driving and carrying wheel for use on trucks and tractors, the wheel being provided with an internal rack engaged by a pinion carried on the driving shaft, and the rack also being engaged by a pinion mounted on a supporting element connected with the housing of the driving shaft, the pinion last named and the elements associated therewith serving to support the load so far as that particular wheel is concerned.

A further object is to provide a wheel of the type indicated including an internal rack member and pinions coöperating therewith in the manner stated, one of the pinions being provided with anti-friction bearings, and means for protecting the operative elements from mud, dust and other foreign material.

A further object is to provide, in a structure of the type indicated means whereby the load is supported independently of the driving shaft, and at the lowest possible point.

With the foregoing and other objects in view, the invention consists in the novel construction, combination, and arrangement of elements hereinafter described and claimed.

In the accompanying drawings,

Figure 1 is a view in side elevation, with parts broken away,

Fig. 2 is a view in vertical transverse section,

Fig. 3 is a vertical transverse section, the operative elements being removed, and the casing members or mud guards being shown in section, Fig. 4 is a side elevation of the complete wheel, and Fig. 5 shows the mud guard or plate member employed on the opposite side of the wheel.

Fig. 6 is a transverse sectional view of a modified form of the wheel.

Fig. 7 is a fragmentary side elevation of the modified form of the wheel with parts broken away and parts in section.

In the construction to be described, certain details will be mentioned for convenience, but I do not wish to limit myself to these details, since it is obvious that the construction claimed admits of certain modifications or variations in practical use.

The wheel includes a felly 10 and rim 11 provided with internal teeth 12 constituting a continuous rack with which the pinions mentioned below are adapted to mesh. The driving shaft of the motor vehicle is designated 14, and mounted thereon is a pinion 15 coöperating with the aforesaid rack and imparting movement thereto. No load is carried by this pinion, and practically all of the energy applied through the driving shaft is imparted to the wheel in effecting the rotation thereof.

Arranged circumferentially of the rack and the rim 11, on each side, are flanges 17. A plate 20 is secured to the outer flange 17 by bolts 18. A plate 21 about which the felly 10 and rim 11 rotate and which is secured to the housing or bearing 21$^a$ for the shaft 14, has its edge positioned between the inner flange 17 and a ring 21$^b$ carried thereby. The ring 21$^b$ is secured in position by bolts 21$^c$, and the plate 21 is secured to the housing or bearing 21$^a$ as at 21$^d$. Plate 20 is provided with an annular opening 22, permitting access to the interior in order that the moving elements may be lubricated, and plate member or guard 21 is provided with a rectangular central opening 24, through which a bracing element mentioned below passes. Openings 25 and 26 are also provided for the shafts of the pinions, the pinion 15 being keyed to its shaft, and the lower pinion 28 being mounted on shaft 29 and provided with roller bearings 30' for reducing the friction.

A bracing device by means of which the load is supported, is connected in the manner shown with the housing of the driving shaft. This bracing device 30 is provided with forked ends 31 and 32, one of the forked members being riveted to the plate member 21 in the manner indicated.

A stay rod 35 is connected with the bracing element just named, at about the point shown.

The wheel thus described may be placed within a felly of usual construction, the latter being provided with a tire of the type best suited to the purpose for which the wheel is intended. The outer plate or mud guard 20 is bolted to one flange 17 of the wheel, but the inner plate 21 is non-rotatable. The relative proportions of the operative elements may be varied to suit the circumstances.

In the form of the wheel as illustrated in Figs. 6 and 7 of the drawing the teeth 12' are relatively short and do not extend all of the way across the felly of the wheel and consequently a smooth surface 12'' is left at the inner side of the felly and upon this a roller 28' is adapted to travel. The roller 28' is journaled upon the pin 29 which is carried by the arm 31 and the gear wheel 15' which is mounted upon the shaft 14 engages the teeth 12' and rotates the wheel in a manner hereinbefore described. In this form of the invention the weight of the load is borne by the wheel at the lower portion of the felly or rim thereof and the power for rotating the wheel is applied to the upper portion thereof and the wheel or roller 28' which transmits the weight of the load to the wheel is provided with a smooth periphery.

What is claimed is:—

1. A traction device having a driving gear, a wheel provided with a rim thereon to be driven by said gear, a turnable rim-engaging element disposed diametrically opposite to said gear, a shaft on which said gear is fixed, a shaft on which said element is journaled, a stationary supporting member, bearing means extending from the supporting member for the first shaft, and bearing arms extending from the supporting member to mount the second shaft, a plate on which the rim rotates, and means securing one of the arms to the plate.

2. A traction device having a rim with an inwardly extending first and second flange, a plate secured to the first flange, said rim having internal gear teeth, a drive pinion therefor between the flanges, a shaft for the pinion, a pinion diametrically opposite to said pinion, a stationary plate engaged by the second flange, means secured to the second flange overlapping the stationary plate, a housing in which the shaft is journaled, said shaft also passing through and being journaled in the stationary plate, a supporting structure having an arm mounting the housing, spaced mounting arms on the structure, one of the mounting arms being secured to the stationary plate, and a shaft for the second pinion journaled in the mounting arms and the stationary plate.

In testimony whereof I affix my signature.

THOMAS C. HARVEY.